(12) United States Patent
Sakurada et al.

(10) Patent No.: US 11,498,521 B2
(45) Date of Patent: Nov. 15, 2022

(54) VEHICLE CONTROL APPARATUS, VEHICLE CONTROL SYSTEM, AND COMPUTER READABLE RECORDING MEDIUM

(71) Applicants: TOYOTA JIDOSHA KABUSHIKI KAISHA, Toyota (JP); CMC CORPORATION, Nagoya (JP)

(72) Inventors: Shin Sakurada, Toyota (JP); Yasuhisa Ohta, Toyota (JP); Satoru Sakuma, Nagakute (JP); Yuki Tatsumoto, Nagoya (JP); Naoyuki Takada, Toyota (JP); Tetsu Yajima, Nagoya (JP)

(73) Assignees: TOYOTA JIDOSHA KABUSHIKI KAISHA, Toyota (JP); CMC CORPORATION, Nagoya (JP)

( * ) Notice: Subject to any disclaimer, the term of this patent is extended or adjusted under 35 U.S.C. 154(b) by 0 days.

(21) Appl. No.: 17/323,049

(22) Filed: May 18, 2021

(65) Prior Publication Data
US 2021/0370874 A1 Dec. 2, 2021

(30) Foreign Application Priority Data
May 26, 2020 (JP) .............................. JP2020-091667

(51) Int. Cl.
*B60R 25/24* (2013.01)
*B60R 25/04* (2013.01)
*B60R 25/10* (2013.01)
*G07C 9/00* (2020.01)

(52) U.S. Cl.
CPC ............ *B60R 25/245* (2013.01); *B60R 25/04* (2013.01); *B60R 25/1003* (2013.01); *G07C 9/00309* (2013.01); *B60R 2325/10* (2013.01); *B60R 2325/205* (2013.01); *G07C 2009/00769* (2013.01); *G07C 2209/63* (2013.01)

(58) Field of Classification Search
None
See application file for complete search history.

(56) References Cited

U.S. PATENT DOCUMENTS

| | | | |
|---|---|---|---|
| 2005/0001483 A1* | 1/2005 | Matsubara | B60R 25/209 307/10.6 |
| 2007/0168104 A1* | 7/2007 | Nelson | B60T 7/16 307/10.6 |
| 2015/0298655 A1* | 10/2015 | Monthel | G06Q 50/30 701/2 |
| 2017/0136990 A1* | 5/2017 | Tercero | B60R 25/01 |
| 2018/0339676 A1* | 11/2018 | Lazarini | G07C 9/00309 |
| 2021/0046899 A1* | 2/2021 | Uttam | G07C 9/00309 |
| 2021/0096559 A1* | 4/2021 | Diamond | H04W 12/61 |

FOREIGN PATENT DOCUMENTS

| | | |
|---|---|---|
| JP | 2011-074721 A | 4/2011 |
| JP | 2015-218457 A | 12/2015 |

* cited by examiner

*Primary Examiner* — Carlos Garcia
(74) *Attorney, Agent, or Firm* — Sughrue Mion, PLLC

(57) ABSTRACT

A vehicle control apparatus includes a processor including hardware, the processor being configured to determine whether or not a position of a key device is located within a predetermined area, and in a case where the position of the key device is located within the predetermined area, stop a smart key function of a vehicle or transmit a first signal requesting setting of a remote immobilizer function of the vehicle.

20 Claims, 3 Drawing Sheets

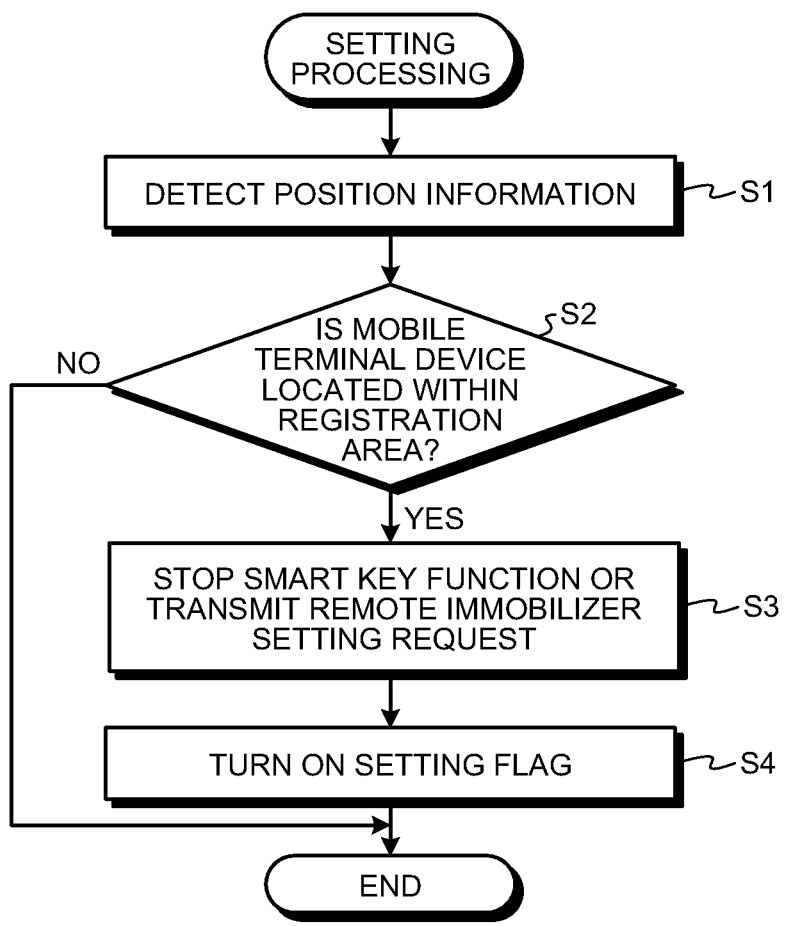

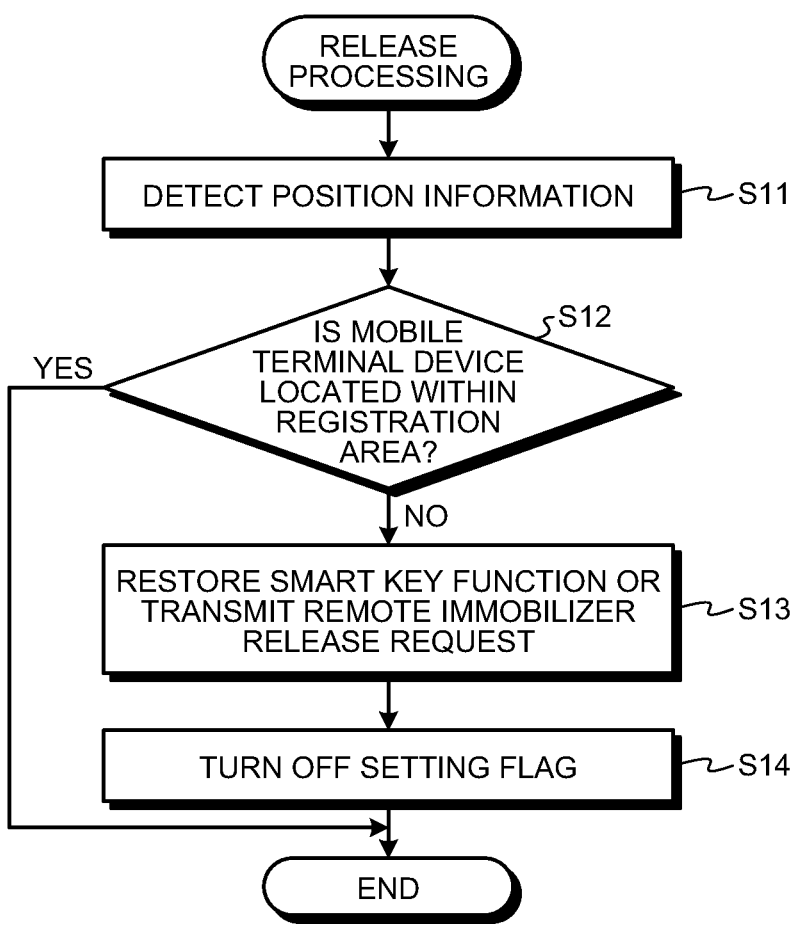

VEHICLE CONTROL APPARATUS, VEHICLE CONTROL SYSTEM, AND COMPUTER READABLE RECORDING MEDIUM

The present application claims priority to and incorporates by reference the entire contents of Japanese Patent Application No. 2020-091667 filed in Japan on May 26, 2020.

BACKGROUND

The present disclosure relates to a vehicle control apparatus, a vehicle control system, and a computer readable recording medium.

JP 2011-74721 A discloses a smart entry system allowing unlocking of a door of a vehicle when wireless communication for unlocking the door of the vehicle is performed between the vehicle and a key device, and a position of the key device is located within an unlocking permission range based on a position of the key device at the time of locking the door.

SUMMARY

There is a need for a vehicle control apparatus, a vehicle control system, and a computer readable recording medium capable of improving convenience of vehicle operation by a user.

According to one aspect of the present disclosure, there is provided a vehicle control apparatus including a processor including hardware, the processor being configured to determine whether or not a position of a key device is located within a predetermined area, and in a case where the position of the key device is located within the predetermined area, stop a smart key function of a vehicle or transmit a first signal requesting setting of a remote immobilizer function of the vehicle.

BRIEF DESCRIPTION OF THE DRAWINGS

FIG. 2 is a flowchart illustrating a flow of setting processing according to the embodiment; and FIG. 3 is a flowchart illustrating a flow of release processing according to the embodiment.

DETAILED DESCRIPTION

Figure 1:
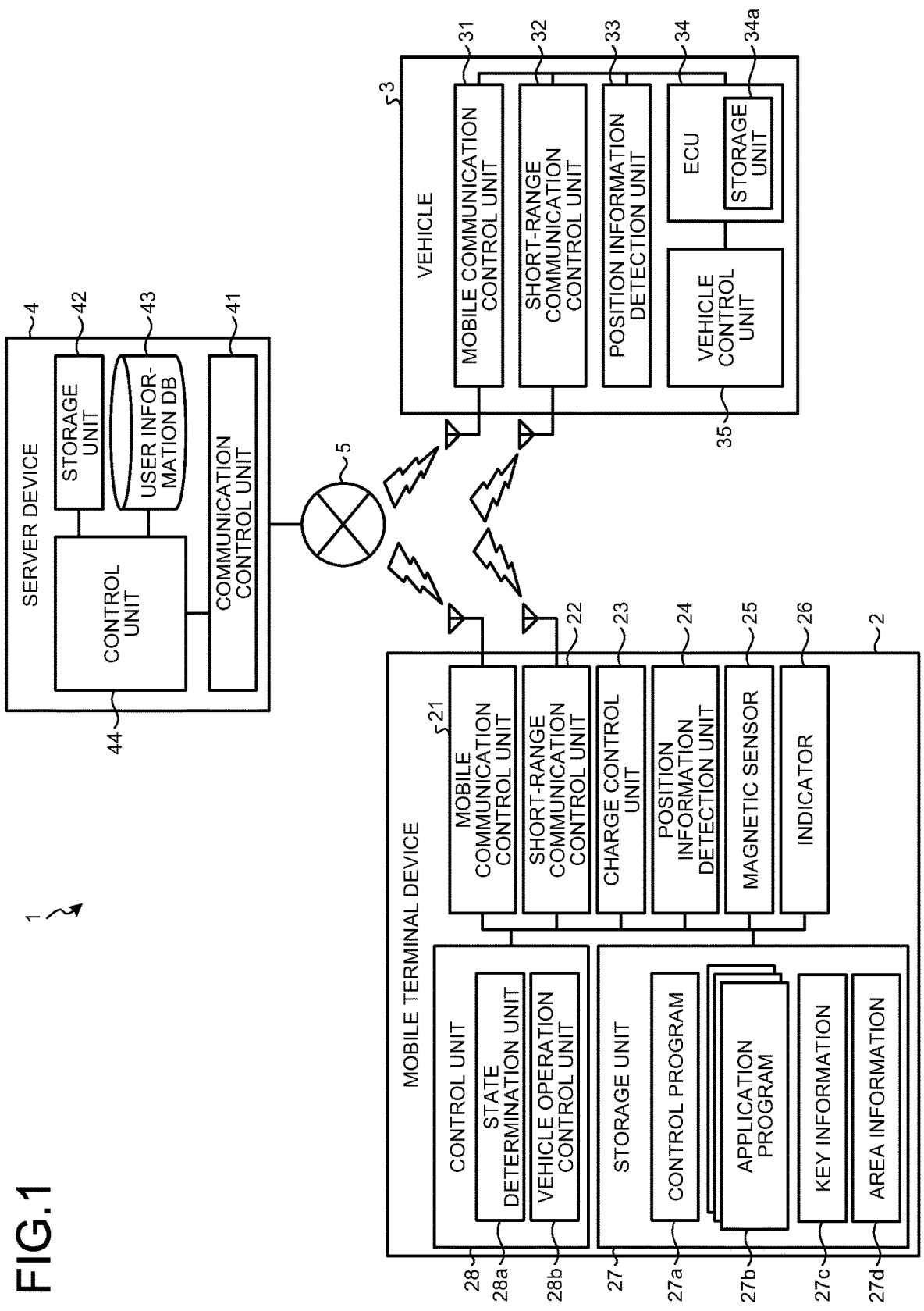
FIG. 1 is a block diagram illustrating a configuration of a vehicle control system according to an embodiment.

Hereinafter, a vehicle control system according to an embodiment will be described in detail with reference to the drawings.

First, a configuration of the vehicle control system according to the embodiment will be described with reference to FIG. 1.

The vehicle control system according to the embodiment is for controlling a smart key function and a remote immobilizer function mounted on a vehicle.

Here, the "smart key function" means a function of unlocking and locking a door of the vehicle by performing short-range wireless communication between a key device possessed by a user and the vehicle. The smart key function includes a smart entry function of unlocking or the like of the door by the vehicle authenticating the key device through short-range wireless communication when the user having the key device approaches the vehicle and by the user touching a door knob or the like of the vehicle, and a remote keyless entry function of unlocking or the like of the door by the user operating a switch provided in the key device. In the present embodiment, turning on the smart key function to permit unlocking of the door of the vehicle by short-range wireless communication is expressed as "set (restore) the smart key function", and turning off the smart key function to prohibit unlocking of the door of the vehicle by short-range wireless communication is expressed as "stop (release) the smart key function".

In addition, the "remote immobilizer function" means a function of prohibiting starting of an engine of the vehicle by remote operation from a server device. In the present embodiment, turning on the remote immobilizer function to prohibit starting of the engine of the vehicle is expressed as "set the remote immobilizer function", and turning off the remote immobilizer function to permit starting of the engine of the vehicle is expressed as "stop (release) the remote immobilizer function".

FIG. 1 is a block diagram illustrating a configuration of the vehicle control system according to the embodiment. As illustrated in FIG. 1, a vehicle control system 1 according to the embodiment includes a mobile terminal device 2, a vehicle 3, and a server device 4, and the mobile terminal device 2, the vehicle 3, and the server device 4 may perform information communication with each other via a telecommunication line 5 such as an Internet line network or a mobile phone line network.

The mobile terminal device 2 functions as a key device. The mobile terminal device 2 includes a device capable of performing information communication with the vehicle 3 and the server device 4, such as a smartphone and a smart key, and is possessed by a user who owns the vehicle 3. In the present embodiment, the mobile terminal device 2 includes a mobile communication control unit 21, a short-range communication control unit 22, a charge control unit 23, a position information detection unit 24, a magnetic sensor 25, an indicator 26, a storage unit 27, and a control unit 28.

The mobile communication control unit 21 includes a communication circuit for information communication via the telecommunication line 5, and controls information communication with the vehicle 3 and the server device 4 via the telecommunication line 5. Specifically, the mobile communication control unit 21 modulates a signal to be transmitted into a frequency band of the telecommunication line 5 and transmits the modulated signal, and when receiving a signal in the frequency band of the telecommunication line 5, demodulates the signal.

The short-range communication control unit 22 includes an electronic circuit having an information communication function conforming to a standard such as near field radio communication (NFC), Bluetooth (registered trademark) low energy (BLE), or Infrared Data Association (IrDA), and controls short-range wireless communication with the vehicle 3. Specifically, the short-range communication control unit 22 modulates a signal to be transmitted and transmits the modulated signal to the vehicle 3, and when receiving a signal from the vehicle 3, demodulates the signal.

The charge control unit 23 is a device that controls charging operation of a secondary battery such as a battery provided in the mobile terminal device 2 by an external power source.

The position information detection unit 24 includes a device that detects position information of the mobile terminal device 2 by receiving radio waves from a global positioning system (GPS) satellite, and outputs, to the control unit 28, an electric signal indicating the detected position information of the mobile terminal device 2.

The magnetic sensor 25 includes a magnetic sensor capable of detecting a direction of geomagnetism in three axis directions, for example, and outputs, to the control unit 28, an electric signal indicating the detected direction of geomagnetism. By using the magnetic sensor 25, for example, it is possible to determine whether or not the mobile terminal device 2 is in a stationary state.

The indicator 26 lights and blinks in accordance with a control signal from the control unit 28, thereby presenting operation states of the smart key function and the remote immobilizer function to a user. Thus, the user may confirm the operation states of the smart key function and the remote immobilizer function any time.

The storage unit 27 includes a recording medium such as an erasable programmable read only memory (EPROM), a hard disk drive (HDD), and a removable medium. Examples of the removable medium include a universal serial bus (USB) memory and a disc recording medium such as a compact disc (CD), a digital versatile disc (DVD), and a Blu-ray (registered trademark) disc (BD). The storage unit 27 stores various computer programs and various types of control data necessary for operation of the mobile terminal device 2. In the present embodiment, the storage unit 27 stores a control program 27a and various application programs 27b that are computer programs, key information 27c used for the smart key function, and area information 27d indicating an area where the vehicle 3 is not used (area including a position of a home of a user, a company where the user works, or the like, and the vicinity thereof). The area information 27d is registered in advance by the user operating the mobile terminal device 2.

The control unit 28 includes a processor including a central processing unit (CPU), a digital signal processor (DSP), and a field-programmable gate array (FPGA), and a main storage unit including a random access memory (RAM) and a ROM. The control unit 28 loads a computer program stored in the storage unit 27 in a work area of the main storage unit and executes the computer program to control each component of the mobile terminal device 2. In the present embodiment, the control unit 28 loads the control program 27a stored in the storage unit 27 in the work area of the main storage unit, and executes the control program 27a to function as a state determination unit 28a and a vehicle operation control unit 28b. Functions of the state determination unit 28a and the vehicle operation control unit 28b will be described later.

The vehicle 3 includes a well-known vehicle such as an electric vehicle (EV), a hybrid vehicle (HV), or a fuel cell electric vehicle (FCEV), and includes a mobile communication control unit 31, a short-range communication control unit 32, a position information detection unit 33, an electric control unit (ECU) 34, and a vehicle control unit 35.

The mobile communication control unit 31 includes a communication circuit for information communication via the telecommunication line 5, and controls information communication with the mobile terminal device 2 and the server device 4 via the telecommunication line 5. Specifically, the mobile communication control unit 31 modulates a signal to be transmitted into a frequency band of the telecommunication line 5 and transmits the modulated signal, and when receiving a signal in the frequency band of the telecommunication line 5, demodulates the signal.

The short-range communication control unit 32 includes an electronic circuit having an information communication function conforming to a standard such as NFC, BLE, or IrDA, and controls short-range wireless communication with the mobile terminal device 2. Specifically, the short-range communication control unit 32 modulates a signal to be transmitted and transmits the modulated signal to the mobile terminal device 2, and when receiving a signal from the mobile terminal device 2, demodulates the signal.

The position information detection unit 33 includes a device that detects position information of the vehicle 3 by receiving radio waves from a GPS satellite, and outputs, to the ECU 34, an electric signal indicating the detected position information of the vehicle 3. Note that, as a method of detecting position information of the vehicle 3, a method combining light detection and ranging or laser imaging detection and ranging (LiDAR) and a three-dimensional digital map may be adopted.

The ECU 34 includes a processor including a CPU, a DSP, and a FPGA, and a storage unit 34a including a RAM and a ROM. The ECU 34 executes a computer program stored in the storage unit 34a to comprehensively control operation of various components mounted on the vehicle 3. In the present embodiment, the ECU 34 authenticates the mobile terminal device 2 by collating the key information 27c transmitted from the mobile terminal device 2 with key information 27c stored in the storage unit 34a, and when the mobile terminal device 2 is authenticated, controls the vehicle control unit 35 to unlock or lock a door of the vehicle 3. In addition, the ECU 34 controls the vehicle control unit 35 in response to receiving a setting signal or a stop signal for the remote immobilizer function from the server device 4, thereby prohibiting or permitting starting of an engine of the vehicle 3.

The vehicle control unit 35 controls operation of various components mounted on the vehicle 3 in accordance with control signals from the ECU 34. In the present embodiment, the vehicle control unit 35 controls locking and unlocking of the door of the vehicle 3 in accordance with a control signal from the ECU 34. In addition, the vehicle control unit 35 prohibits or permits starting of the engine of the vehicle 3 in accordance with a control signal from the ECU 34.

The server device 4 includes an information processing apparatus such as a workstation, and includes a communication control unit 41, a storage unit 42, a user information database (user information DB) 43, and a control unit 44.

The communication control unit 41 includes a communication circuit for information communication via the telecommunication line 5, and controls information communication with the mobile terminal device 2 and the vehicle 3 via the telecommunication line 5. Specifically, the communication control unit 41 modulates a signal to be transmitted into a frequency band of the telecommunication line 5 and transmits the modulated signal, and when receiving a signal in the frequency band of the telecommunication line 5, demodulates the signal.

The storage unit 42 includes a recording medium such as an EPROM, an HDD, and a removable medium. The storage unit 42 stores various computer programs and various types of control data necessary for operation of the server device 4.

The user information DB 43 stores unique identification information assigned to the mobile terminal device 2 possessed by a user and unique identification information assigned to the vehicle 3 owned by the user in association with each other.

The control unit 44 includes a processor including a CPU, a DSP, and a FPGA, and a main storage unit including a RAM and a ROM. The control unit 44 loads a computer program stored in the storage unit 42 in a work area of the main storage unit and executes the computer program to control each component of the server device 4.

In the vehicle control system 1 having such a configuration, the mobile terminal device 2 executes setting processing and release processing described below to improve convenience of vehicle operation by a user. Hereinafter, operation of the mobile terminal device 2 when executing the setting processing and the release processing will be described with reference to FIGS. 2 and 3.

FIG. 2 is a flowchart illustrating a flow of the setting processing according to the embodiment. The flowchart illustrated in FIG. 2 starts when a state of a setting flag indicating whether or not a vehicle may be operated is in an off state indicating that the vehicle may be operated, and the setting processing proceeds to processing of Step S1. While the state of the setting flag is in the off state, this setting processing is repeatedly executed every time a predetermined time elapses after an end of previous setting processing.

In the processing of Step S1, the state determination unit 28a detects position information of the mobile terminal device 2 by using the position information detection unit 24. Thus, the processing of Step S1 is completed, and the setting processing proceeds to processing of Step S2.

In the processing of Step S2, the state determination unit 28a reads the area information 27d from the storage unit 27. Then, the state determination unit 28a compares the position information of the mobile terminal device 2 acquired in the processing of Step S1 with the area information 27d to determine whether or not a current position of the mobile terminal device 2 is located within an area defined in the area information 27d. As a result of the determination, when the current position of the mobile terminal device 2 is located within the area defined in the area information 27d (Step S2: Yes), the state determination unit 28a advances the setting processing to processing of Step S3. On the other hand, when the current position of the mobile terminal device 2 is not located within the area defined in the area information 27d (Step S2: No), the state determination unit 28a ends a series of the setting processing.

In the processing of Step S3, the vehicle operation control unit 28b stops the smart key function so as to invalidate execution of the smart key function, or transmits a setting request signal for the remote immobilizer function to the server device 4 via the telecommunication line 5. In response to receiving the setting request signal for the remote immobilizer function from the mobile terminal device 2, the server device 4 reads, from the user information DB 43, identification information of the vehicle 3 associated with identification information of the mobile terminal device 2 included in the setting request signal. Then, the server device 4 sets the remote immobilizer function by communicating with the vehicle 3 corresponding to the identification information read via the telecommunication line 5. Thus, the processing of Step S3 is completed, and the setting processing proceeds to processing of Step S4.

In the processing of Step S4, the vehicle operation control unit 28b sets the state of the setting flag to an on state indicating that the vehicle cannot be operated. Then, the vehicle operation control unit 28b sets a state of the indicator 26 to a state indicating that the smart key function is stopped or that the remote immobilizer function is set. Thus, the processing of Step S4 is completed, and a series of the setting processing ends.

FIG. 3 is a flowchart illustrating a flow of the release processing according to the embodiment. The flowchart illustrated in FIG. 3 starts when the state of the setting flag is in the on state, and the release processing proceeds to processing of Step S11. While the state of the setting flag is in the on state, this release processing is repeatedly executed every time a predetermined time elapses after an end of previous release processing.

In the processing of Step S11, the state determination unit 28a detects position information of the mobile terminal device 2 by using the position information detection unit 24. Thus, the processing of Step S11 is completed, and the release processing proceeds to processing of Step S12.

In the processing of Step S12, the state determination unit 28a reads the area information 27d from the storage unit 27. Then, the state determination unit 28a compares the position information of the mobile terminal device 2 acquired in the processing of Step S11 with the area information 27d to determine whether or not a current position of the mobile terminal device 2 is located within an area defined in the area information 27d. As a result of the determination, when the current position of the mobile terminal device 2 is located within the area defined in the area information 27d (Step S12: Yes), the state determination unit 28a ends a series of the release processing. On the other hand, when the current position of the mobile terminal device 2 is not located within the area defined in the area information 27d (Step S12: No), the state determination unit 28a advances the release processing to processing of Step S13.

In the processing of Step S13, the vehicle operation control unit 28b restores the smart key function so as to validate execution of the smart key function, or transmits a release request signal for the remote immobilizer function to the server device 4 via the telecommunication line 5. In response to receiving the release request signal for the remote immobilizer function from the mobile terminal device 2, the server device 4 reads, from the user information DB 43, identification information of the vehicle 3 associated with identification information of the mobile terminal device 2 included in the setting request signal. Then, the server device 4 releases the remote immobilizer function by communicating with the vehicle 3 corresponding to the identification information read via the telecommunication line 5. Thus, the processing of Step S13 is completed, and the release processing proceeds to processing of Step S14.

In the processing of Step S14, the vehicle operation control unit 28b sets the state of the setting flag to the off state. Then, the vehicle operation control unit 28b sets the state of the indicator 26 to a state indicating that the smart key function is set or that the remote immobilizer function is released. Thus, the processing of Step S14 is completed, and a series of the release processing ends.

As is obvious from the above description, in the vehicle control system 1 according to the embodiment, when a position of the mobile terminal device 2 is located within an area registered in advance, the control unit 28 stops the smart key function or transmits, to the server device 4, a signal requesting setting of the remote immobilizer function. Thus, a user may conveniently operate the vehicle 3.

According to the present disclosure, convenience of vehicle operation by a user may be improved.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle control apparatus comprising:
   a processor comprising hardware, the processor being configured to
   determine whether or not a position of a key device is located within a predetermined area,
   in a case where the position of the key device is located within the predetermined area, transmit a first signal requesting setting of a remote immobilizer function of a vehicle, wherein the setting of the remote immobilizer function of the vehicle includes prohibiting starting of the vehicle by remote operation, and
   in a case where the position of the key device is located outside the predetermined area, transmit a second signal requesting release of the set remote immobilizer function of the vehicle, wherein the release of the set remote immobilizer function of the vehicle includes removing the prohibition on starting of the vehicle by remote operation.

2. The vehicle control apparatus according to claim 1, wherein when the position of the key device is located outside the predetermined area in a state where a smart key function is stopped, the processor is configured to restore the smart key function.

3. The vehicle control apparatus according to claim 1, wherein the predetermined area is an area where the vehicle is not used.

4. The vehicle control apparatus according to claim 1, wherein the processor is configured to output information indicating operation states of a smart key function and the remote immobilizer function.

5. The vehicle control apparatus according to claim 1, wherein the predetermined area is an area registered in advance by a user.

6. The vehicle control apparatus according to claim 5, wherein the predetermined area is an area including a position of a home of the user and a vicinity of the home of the user.

7. The vehicle control apparatus according to claim 5, wherein the predetermined area is an area including a position of a company where the user works and a vicinity of the company.

8. A vehicle control system comprising:
   a vehicle;
   a key device comprising a first processor comprising hardware; and
   a server comprising a second processor comprising hardware,
   wherein the first processor is configured to
   determine whether or not a position of the key device is located within a predetermined area, and
   in a case where the position of the key device is located within the predetermined area, transmit a first signal requesting setting of a remote immobilizer function of the vehicle,
   the second processor is configured to set the remote immobilizer function by communicating with the vehicle in response to receiving the first signal, wherein the setting of the remote immobilizer function includes prohibiting starting of the vehicle by remote operation,
   in a case where the position of the key device is located outside the predetermined area, transmit a second signal requesting release of the set remote immobilizer function of the vehicle, and
   the second processor is configured to release the set the remote immobilizer function by communicating with the vehicle in response to receiving the second signal, wherein the release of the set remote immobilizer function includes removing the prohibition on the starting of the vehicle by remote operation.

9. The vehicle control system according to claim 8, wherein
   in a case where the position of the key device is located outside the predetermined area in a state where a smart key function is stopped, the first processor is configured to restore the smart key function, and
   the second processor is configured to stop the remote immobilizer function by communicating with the vehicle in response to receiving the second signal.

10. The vehicle control system according to claim 8, wherein the predetermined area is an area where the vehicle is not used.

11. The vehicle control system according to claim 8, wherein the first processor is configured to output information indicating operation states of a smart key function and the remote immobilizer function.

12. The vehicle control system according to claim 8, wherein the predetermined area is an area registered in advance by a user.

13. The vehicle control system according to claim 12, wherein the predetermined area is an area including a position of a home of the user and a vicinity of the home of the user.

14. The vehicle control system according to claim 12, wherein the predetermined area is an area including a position of a company where the user works and a vicinity of the company.

15. A non-transitory computer-readable recording medium on which an executable program is recorded, the program causing a processor of a computer to execute:
   determining whether or not a position of a key device is located within a predetermined area;
   in a case where the position of the key device is located within the predetermined area, transmitting a first signal requesting setting of a remote immobilizer function of a vehicle, wherein the setting of the remote immobilizer function of the vehicle includes prohibiting starting of the vehicle by remote operation; and
   in a case where the position of the key device is located outside the predetermined area, transmit a second signal requesting release of the set remote immobilizer function of the vehicle, wherein the release of the set remote immobilizer function of the vehicle includes removing the prohibition on starting of the vehicle by remote operation.

16. The non-transitory computer-readable recording medium according to claim 15, wherein the program causes the processor to execute, in a case where the position of the key device is located outside the predetermined area in a state where a smart key function is stopped, restoring the smart key function.

17. The non-transitory computer-readable recording medium according to claim 15, wherein the predetermined area is an area where the vehicle is not used.

18. The non-transitory computer-readable recording medium according to claim 15, wherein the predetermined area is an area registered in advance by a user.

19. The non-transitory computer-readable recording medium according to claim 18, wherein the predetermined area is an area including a position of a home of the user and a vicinity of the home of the user.

20. The non-transitory computer-readable recording medium according to claim 18, wherein the predetermined area is an area including a position of a company where the user works and a vicinity of the company.

\* \* \* \* \*